United States Patent [19]

Bachner

[11] 4,403,465

[45] Sep. 13, 1983

[54] METHOD AND DEVICE FOR CLOSING AND SEALING GABLE SHAPED FOLDING CARTONS

[75] Inventor: George L. Bachner, Barrington, Ill.

[73] Assignee: Nimco Corporation, Crystal Lake, Ill.

[21] Appl. No.: 414,453

[22] Filed: Sep. 2, 1982

Related U.S. Application Data

[63] Continuation of Ser. No. 145,776, May 2, 1980, abandoned.

[51] Int. Cl.$^3$ .............................................. B65B 51/14
[52] U.S. Cl. ......................................... 53/477; 53/373;
   53/DIG. 2; 156/73.1; 156/580.2; 156/581
[58] Field of Search .................... 53/373, DIG. 2, 379,
   53/133, 412, 477, 479, 491; 156/73.1, 580.2, 581

[56] References Cited

U.S. PATENT DOCUMENTS

| | | | |
|---|---|---|---|
| 2,726,583 | 12/1955 | Barnes et al. | 93/39 |
| 3,116,002 | 12/1963 | Crawford | 229/17 |
| 3,220,161 | 11/1965 | Loshe et al. | 53/373 |
| 3,370,399 | 2/1968 | Egleston | 53/379 |
| 3,392,458 | 7/1968 | Braun . | |
| 3,468,731 | 9/1969 | Obeda . | |
| 3,488,244 | 1/1970 | Lepisto . | |
| 3,765,144 | 10/1973 | Schiesser . | |
| 3,788,917 | 1/1974 | Linda . | |
| 3,825,408 | 7/1974 | Farfaglia et al. . | |
| 3,889,449 | 6/1975 | Membrino . | |
| 3,890,765 | 6/1975 | Fargaglia et al. . | |
| 3,956,975 | 5/1976 | Egelston et al. . | |
| 4,078,364 | 3/1978 | Schmidt . | |
| 4,079,570 | 3/1978 | Rucker | 53/373 X |
| 4,159,220 | 6/1979 | Bosche et al. . | |

Primary Examiner—Horace M. Culver
Attorney, Agent, or Firm—Kirkland & Ellis

[57] ABSTRACT

Apparatus and method for forming sealed joints, including a pouring lip sanitarily protected therein, by welding layers of thermoplastic coated paperboard together. Paperboard layers are pressed together by jaws, with relieved areas where excessive pressure would render pouring lip less satisfactory, while or after heat is applied to said paperboard layers. The apparatus and method is particularly useful for forming sealed joints for paperboard cartons, such as milk cartons.

12 Claims, 7 Drawing Figures

U.S. Patent  Sep. 13, 1983  Sheet 1 of 2  4,403,465
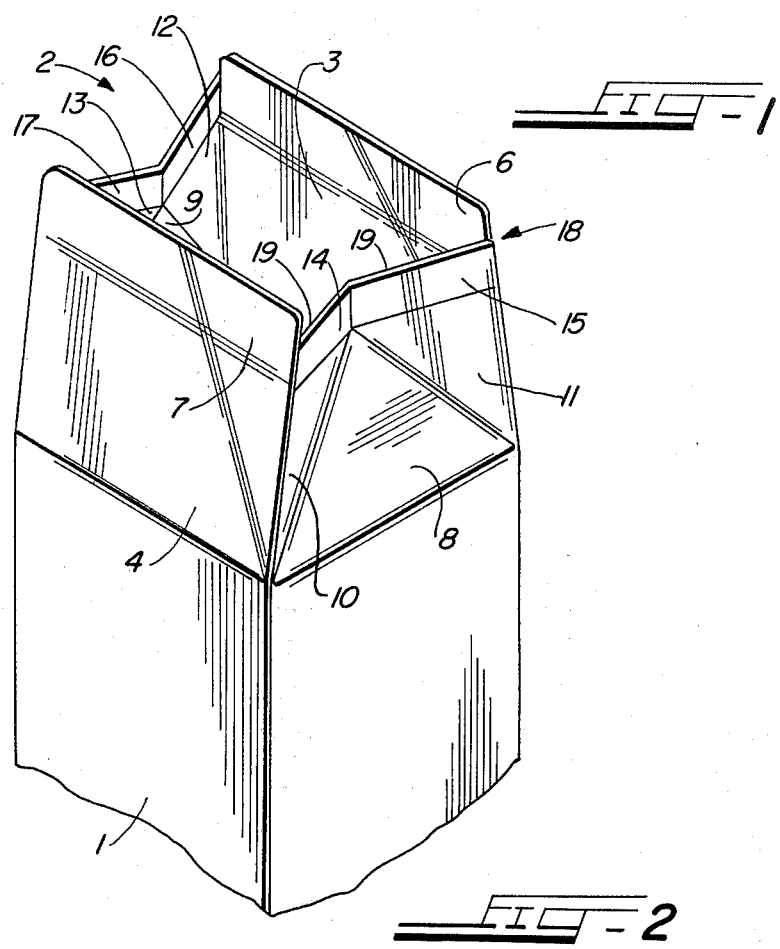
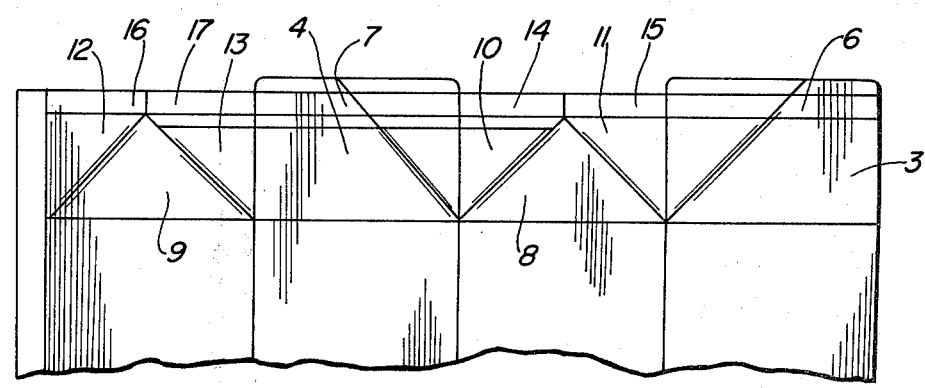
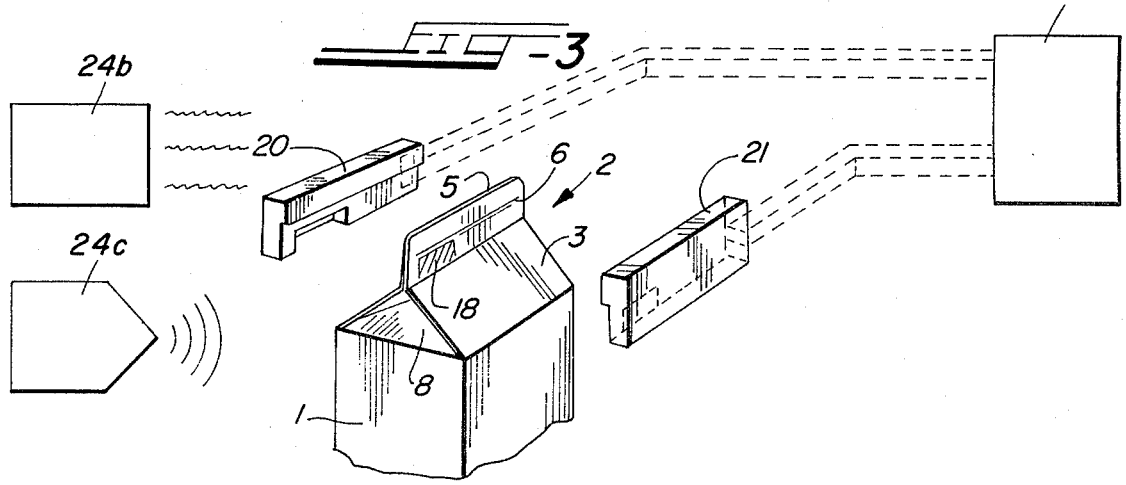

METHOD AND DEVICE FOR CLOSING AND SEALING GABLE SHAPED FOLDING CARTONS

This is a continuation, of application Ser. No. 145,776, filed May 2, 1980, and now abandoned.

TECHNICAL FIELD

This invention relates generally to packaging methods and apparatus, and is particularly concerned with methods and apparatus for welding together layers of thermoplastic coated paperboard or the like to form a liquid-proof joint, including a pouring lip sanitarily protected therein. More particularly the invention relates to an improved method and apparatus for improving the quality and ease of opening of the pouring lip area.

BACKGROUND ART

In the packaging of fluids such as milk and other dairy products, extensive use is made of containers formed of paperboard sheet material having an overall coating of thermoplastic film such as polyethylene applied on the surfaces of the sheet. This plastic coated paperboard is impervious to moisture and is particularly suitable for use in packaging acidic products of which milk and orange juice are illustrative. The thermoplastic coating not only serves to moisture proof the container but also can be utilized for sealing the container closing flaps. This sealing action is accomplished by heating the surfaces to be sealed while pressing them tightly together to form a liquid tight plastic-to-plastic bond. In many such containers a spout having a pouring lip is enclosed within the closure portion of the container. When the container is sealed the sanitary integrity of the pouring lip is preserved until the container is opened. When the paperboard blank from which the container is formed is initially prepared, all of the surfaces of the container are coated with the thermoplastic material. The pouring lip is thus also coated, and in the event heat and pressure are applied evenly to all parts of the closure, it becomes tightly sealed within the closure. When such a container is opened the lip is apt to become damaged, resulting in objectionable operation and presenting an unsightly appearance. One object of the present invention is to provide for use with a container of plastic coated paperboard having a pouring lip sanitarily housed within a sealed enclosure, an improved method and apparatus for protecting this pouring lip from being permanently and inaccessibly sealed within the enclosure.

Another previously proposed method (described in U.S. Pat. No. 3,116,002) is the application of a nonadherent material to selected portions of the pouring spout. This method introduces the risk of misapplication of the material which could cause leaking seals or a hard-to-open pouring lip. The invention disclosed herein eliminates those risks, the cost of the non-adherent material, and the cost of application of that material.

A further major advantage of the present invention over previous methods for closing and sealing folded cartons is that it facilitates the efficient use of manufacturing equipment. It is normal practice in the folded carton manufacturing industry to utilize standard, rotary printing presses to make the blanks which are then folded into cartons. Such rotary printing presses normally have only a limited number (e.g. four) of color stands and therefore are capable of printing only a limited number of colors. In previous methods for closing and sealing folded cartons, it is necessary to utilize one of the color stands for printing an adhesive thereby leaving one less color stand available for printing colors. The present invention eliminates the necessity of printing an abhesive onto the carton blanks leaving all color stands available for printing colors. Thus, the present invention facilitates the manufacture of more colorful folded cartons using standard manufacturing equipment than previous methods, which can be a significant marketing advantage with respect to the products sold in such folded cartons.

DISCLOSURE OF THE INVENTION

A closure formed of thermoplastic coated paperboard or other suitable material is sealed by subjecting the closure elements to be sealed to heat and pressure. A pouring spout is made accessible from a closure sealing rib by employing multiplanar jaws rather than flat jaws in the sealing process. A relieved area formed by the multiplier surfaces causes less force to be exerted in the area of the pouring spout compared with the force exerted on the remainder of the closure sealing rib. The use of this method and apparatus permits the pouring spout to be opened by pulling it apart from the closure sealing rib.

Other objects and advantages of the present invention will become apparent as the following description proceeds in connection with the accompanying figures wherein:

BRIEF DESCRIPTION OF THE DRAWINGS

FIG. 1 is a perspective view of a fragmentary portion of a container of the type shown in FIG. 3 with the gabled end closure portion in the open, unsealed position.

FIG. 2 is a fragmentary portion of the outside surface of a flat blank of plastic coated paperboard material from which the container shown in FIG. 3 can be erected.

FIG. 3 shows a fragmentary portion of an illustrative container having an enclosed pouring spout to which the present invention has been applied.

BEST MODE OF CARRYING OUT THE INVENTION

Figure 4:
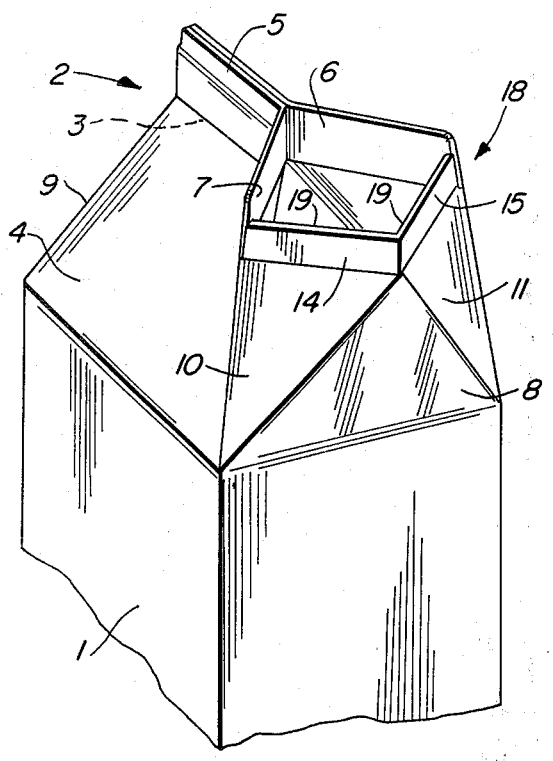
FIG. 4 illustrates the gabled end portion of a container of the type shown in FIG. 1 with the pouring spout opened and the pouring lip in position for dispensing the container contents.

Referring more specifically to FIG. 1 there is shown an illustrative container formed of thermoplastic coated paperboard. The container comprises a tubular body 1 of generally rectangular cross section having a top closure 2 which will be recognized as the familiar gable top closure characterized by inclined roof panels 3, 4. The gable top closure is formed by the inclined roof panels 3, 4, each of which is surmounted by an outer sealing rib panel 6, 7, together with a pair of in-turned triangular end panels 8, 9, each joined to the adjacent roof panels 3, 4, by triangular fold-back panels 10, 11, and 12, 13, respectively. To complete the sealing rib each of the triangular fold-back panels includes adjacent its upper edge a corresponding one of inner rib panels 14, 15, and 16, 17. These panels are shown more clearly in FIG. 2 which illustrates a layout of a blank adapted to be erected into the completed container and closure of FIG. 3. In a completed closure of the type shown in FIG. 3 the rib panels are all laminated together with the inner rib panels 14, 15, and 16, 17, folded between the outer rib panels 6, 7, on the inclined roof panels to form an outstanding rib or truss 5. To seal the enclosure heat is applied to that thermoplastic coating on the various roof panels just before, or at the same time as, the container is closed while a sealing pressure is applied to the sealing rib or truss 5 thus formed by the various rib panels so that the hot plastic on the contacting rib surfaces fuses to form a liquid tight sanitary seal. The heat can be applied to the thermoplastic coating on the various roof panels via the jaws 20, 21. The jaws can generate heat by vibrating ultrasonically; such ultrasonic vibration being transmitted to jaws 20, 21 by a suitable source, 24a, as schematically illustrated in FIG. 3. The heat can also be applied to the thermoplastic coating on the various roof panels by caloric radiant heat or by hot air, which can be supplied by a suitable caloric radiant heat source, 24b, or a suitable hot air source, 24c, respectively as shown schematically in FIG. 3. In order to dispense the contents of the container a suitable opening or spout is accessibly provided as a part of the enclosure. For example, in the case of a gable top closure as shown in FIGS. 3 and 4, one or both of the ends of the enclosure may be adapted to be pulled out to form a pouring spout 18 as illustrated in FIG. 4. This is readily accomplished by separating the portions of the rib 5 above one end panel 8 with opposed thumb pressures applied to the adjacent foldback panels 10, 11, and then moving the end panel 8 and the two adjacent fold back panels 10, 11, out from between the inclined roof panels. The contents can then be poured from the container by utilizing these panels and their associated rib panels 14, 15, as a spout 18 in which the free edge portions of the rib panels 10, 11, serve to define a pouring lip 19.

Figure 5:
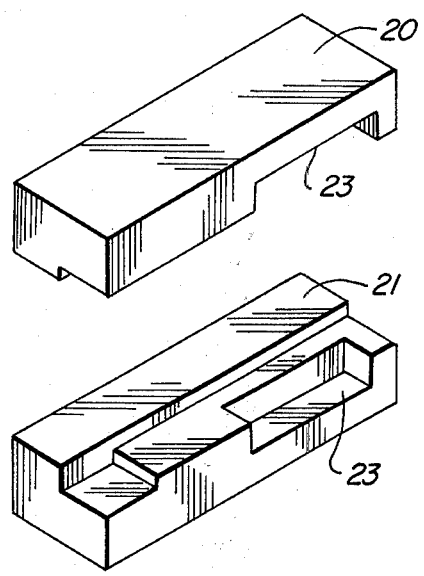
FIG. 5 is a perspective view of the jaws of the subject invention.
Figure 6:
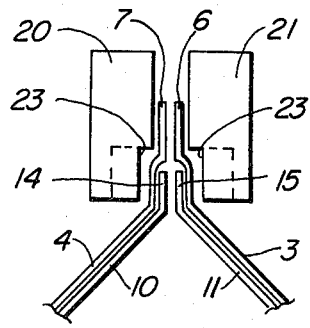
FIG. 6 is a sectional view taken on lines 22—22 of FIG. 7 with the jaws illustrated in their operable positions to perform the welding operation on the gabeled end portion of the illustrated container.
Figure 7:
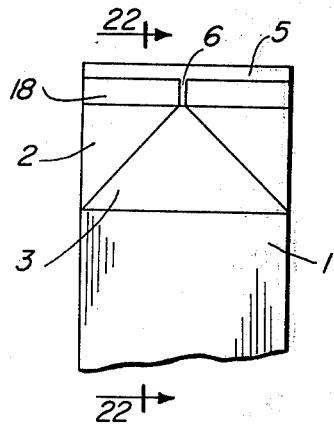
FIG. 7 is a side elevational view of the gabled end closure portion of the container of FIG. 3 in its closed, sealed condition.

When the closure is heated and subjected to pressure to effect a seal and thereby provide a sanitary package, all of the rib panels are subjected to heat at a temperature sufficiently high to render the thermoplastic coating on the container molten or tacky so as to effect a liquid tight seal when the container closure elements are pressed together. Because the thermoplastic material forms an extremely tight bond, provision must be made in the method of construction of the top closure sealing rib 5 to render the pouring spout 18 accessible to the user after the closure has been sealed. By employing multiplanar jaws 20, 21, rather than flat jaws in the sealing process the lip 19 itself is not permanently bonded to the other parts of the closure although it is completely and sanitarily sealed within the enclosure. This is accomplished by providing a relieved area 23 on jaws 20, 21, which exterts less force in the area of the pouring spout 18, as shown in FIGS. 5, 6 and 7, in comparison with the force exerted on the remainder of the rib 5. When such a method and apparatus are used on the pouring lip area it is a simple matter to open the closure and expose a spout having a smooth, undamaged, sanitary pouring lip.

While the preferred embodiment of the invention has been illustrated and described, it is to be understood that the invention is not limited to the precise construction herein disclosed, and the right is reserved to all changes and modifications coming within the scope of the invention as defined in the appended claims.

What is claimed is:

1. In an apparatus for sealing a package having a gable shaped closure, the gable shaped closure having marginal areas forming a sealing truss, the apparatus having jaw means for applying force externally on said marginal areas while the temperature of said marginal areas is elevated to thereby seal the package, the improvement comprising jaw means having a pair of jaws with multiplanar surfaces, each of said jaws having a first planar surface for engaging a first thickness of package material, a second planar surface, recessed from the first planar surface, for engaging a second thickness of package material, a third planar surface, recessed from the second planar surface, for engaging a third thickness of package material, and a fourth planar surface, recessed from the third planar surface, for engaging the third thickness of package material, whereby less force is exerted on the third thickness of package material corresponding to relieved portions engaged by the fourth planar surface of the multiplanar surfaces of said jaw means.

2. An apparatus according to claim 1 wherein said jaw means transmits heat to said sealing truss by vibrational means, said jaw means thereby elevating the temperature of said marginal areas while applying force thereto.

3. An apparatus according to claim 2 wherein said vibrational means comprises ultrasonic means.

4. An apparatus according to claim 1 wherein heat is applied to said sealing truss by caloric radiant heat means.

5. An apparatus according to claim 1 wherein heat is applied to said sealing truss by hot air means.

6. An apparatus according to claim 1 wherein heat is applied to said sealing truss prior to the application of force by said jaw means.

7. In a method of forming a sealed joint in a container having thermoplastic coated surfaces by engaging the outer surface of a sealing truss with jaws and applying a sufficient amount of heat to melt the thermoplastic coating and weld the surfaces together, the sealing truss having a pouring spout folded therein, the improvement which comprises the use of jaws with multiplanar surfaces, each of said jaws having a planar surface for engaging a first thickness of package material, a second planar surface, recessed from the first planar surface, for engaging a second thickness of package material, a third planar surface, recessed from the second planar surface, for engaging a third thickness of package material, and a fourth planar surface, recessed from the third planar surface, for engaging the third thickness of package material, whereby less force is exerted on the sealing truss in the area of the pouring spout compared with the remainder of the sealing truss so that the seal formed in the area of the pouring spout is less secure thereby facilitating the opening of the container to expose the pouring spout.

8. The method according to claim 7 wherein said jaws provide heat to said sealing truss by vibrational means.

9. The method according to claim 8 wherein said vibrational means comprises ultrasonic means.

10. The method according to claim 7 wherein heat is applied to said sealing truss prior to engagement of said sealing truss by said jaws.

11. The method according to claim 7 wherein heat is applied to said sealing truss by caloric radiant heat means.

12. The method according to claim 7 wherein heat is applied to said sealing truss by hot air means.

* * * * *